Dec. 30, 1952  G. BELL ET AL  2,623,914
CONSTRUCTION MATERIALS
Filed Jan. 16, 1951

INVENTORS
George Bell
Phillip Lebovitz.
BY Albert J. Kramer
ATTORNEY

Patented Dec. 30, 1952

2,623,914

UNITED STATES PATENT OFFICE 2,623,914

CONSTRUCTION MATERIALS

George Bell and Phillip Lebovitz, Baltimore, Md., assignors to Waterproof Insulation Corp., Baltimore, Md., a corporation of Maryland Application January 16, 1951, Serial No. 206,219

5 Claims. (Cl. 260—765)

This invention relates to construction materials and is more particularly concerned with compositions suitable for building floors, subfloors, roofs, walls and partitions, laying underground pipes, shaping trenches and similar purposes.

One of the objects of this invention is the provision of a composition for the purposes indicated which contains cement as an ingredient, but which, nevertheless, has good insulating properties, is sound deadening, light in weight and has strong structural properties.

Another object of the invention is the provision of such a composition which has good waterproofing properties and which is resistant to fire and industrial chemicals.

A further object is the provision of such a composition which can be prepared in the form of sheets or blocks or in the form of various units capable of being subjected to various tool operations, such as sawing, punching, nailing, drilling, etc.

A still further object is the provision of a composition of the type mentioned which can be used either in the manner of ordinary concrete or in the form of prefabricated pieces and which is relatively inexpensive as compared to other construction materials in the place of which it may be used.

A still further object is a composition of the type mentioned, the principal ingredient of which is a waste product having limited uses otherwise.

These and other objects and advantages of the invention will be apparent from the following description in which various embodiments of the invention are explained and illustrated.

In general, the composition of this invention comprises a mixture of cement, such as Portland cement, and comminuted rubber. The rubber may be in the form of a dust, commonly known as "buffing dust" and is preferably vulcanized rubber, either natural or synthetic. A suitable source of the rubber component is the waste rubber from worn out or discarded articles, such as rubber tires and similar products. The rubber may be in larger particle sizes, including long filaments resulting from shredding. For most purposes, however, it is preferred that the rubber particles be sufficiently small to pass through a ¼ inch screen mesh.

The rubber is mixed with the cement and water added to the mixture in an amount sufficient to cause the cement to set or gel irreversibly, preferably about twice that required to make mass concrete with the same amount of cement.

To the basic composition described above, there may be added a waterproofing agent or agents of which a number are known and commercially available. Also water-proof cement may be used instead of the ordinary cement. Also, various fillers may be added, such as sand and exploded mica.

The following examples ilustrate compositions in accordance with this invention and certain modifications thereof, but it is to be understood that these examples and modifications are given by way of illustration only and not by way of limitation.

Ninety-four pounds of dry Portland cement is mixed with 160 pounds of dry rubber buffing dust containing particles varying in size from fines to coarse that can pass through a ¼ inch mesh screen. The cement and rubber in the dry state is thoroughly mixed in a conventional concrete mixer. However, hand mixing in a trough may be used instead, if desired.

When thoroughly mixed 12 gallons of clear water is added and mixed in well. The resulting composition can be poured like wet concrete and has good structural strength for general building purposes.

The above composition may be modified by increasing the content of the rubber to as much as 240 pounds or decreasing it to as little as 100 pounds, depending upon the particular use to be made of the final product. Also, the quantity of water can be increased to as much as 16 gallons or decreased to as little as 8 gallons. The quantity of water to be used in any particular case will depend upon the desired slump and weather conditions.

Where waterproofing is desired, one quart of a waterproofing compound, such as those sold under the names of Euco, Aquabar, Ironite and IPC, may be added to the water before admixture with the dry ingredients. When waterproofing compounds are used, the conditions under which the final composition is to be used as a waterproofing material will also be a function of the amount of water added.

Where strength is not a critical factor, that is, where a composition of less structural strength can be tolerated, a filler, such as exploded mica, may be added in the proportion of about 10 to 30%, by volume, of the rubber used. Where still less structural strength can be tolerated and where lightness in weight and insulating properties are not factors of importance, sand may be added to the mixture in the proportion of about 10 to 30%, by volume, of the rubber used.

In the accompanying drawing there is illustrated some of the forms in which the composition of this invention may be used and in which.

One of the many uses of the invention is as a waterproof composition for a roof decking. It may, before setting, be poured over an old flat roof that is to be refinished or used to construct a new roof decking. In the case of the latter (see Fig. 1) the composition 11 would be poured over a paper backed steel mesh 12 or any other suitable material that will hold it until it sets. The resulting coating, when set, requires no further treatment or protection against weather because it will carry a full snow load and will insulate the roof as well as render it waterproof. Also, since it is light in weight and strong, it will require less substructural support than other roofing materials or combinations of materials adapted to accomplish a similar result.

The same method of installation may be employed for utilizing the composition as a subflooring and in this connection serves not only as a waterproofing and insulating material, but also as a sound deadening material with the added property of resisting the action of various industrial chemicals, such as acids and alkalies.

Figure 1:
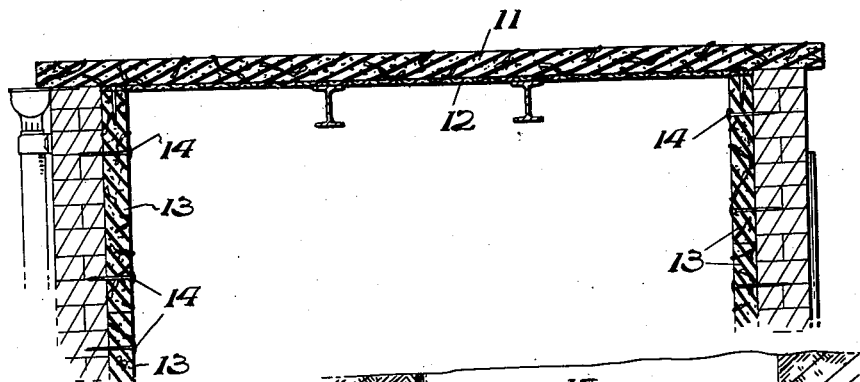
Fig. 1 is a section through a portion of a building have a flat type roof that has been fabricated of a composition in accordance with this invention and preformed panels thereof secured to the inner walls.

There is also illustrated in Fig. 1 the manner of securing preformed blocks 13 of the composition to the walls of a building by nails 14 or other similar means. For a continuous type of wall construction, the composition may be set in place by the use of setting forms.

Figure 3:
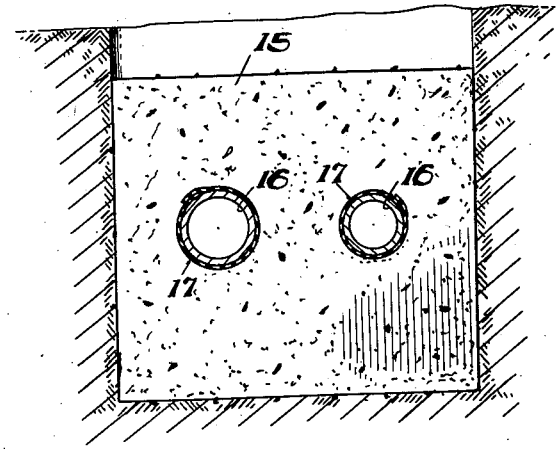
Fig. 3 is a cross sectional view through a pipe trench showing the location of the pipes and the manner in which the composition of the invention may be used to insulate and waterproof the pipes.
Figure 2:
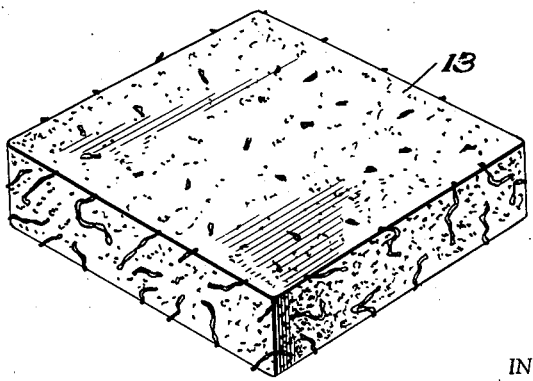
Fig. 2 is a perspective view of one of the preformed blocks shown in Fig. 1.

For underground pipe insulation and waterproofing (see Fig. 3), the material 15 may be poured into trenches or stabilized earth, using the trench sides for form when the trench is cut to proper size or forming the sides of the trench when it is cut too wide or the earth is too soft to hold a clean cut. Before pouring the material, the pipes 16 should preferably be covered with corrugated paper 17 or the like.

Having thus described this invention, what is claimed is:

1. A stress resistant construction material consisting essentially of hydrated Portland cement containing uniformly dispersed particles of comminuted dry prevulcanized rubber in the ratio of about one part cement to not less than one part or more than two and one-half parts rubber, by weight, on a dry basis.

2. A stress resistant construction material consisting essentially of hydrated Portland cement containing uniformly dispersed particles of dry prevulcanized rubber varying in size from fines to one-fourth inch mesh in the ratio of about one part cement to not less than about one part or more than two and one-half parts rubber, by weight, on a dry basis.

3. A construction material as defined by claim 1 containing a dispersion of sand in the proportion of about 10 to 30%, by volume, of the rubber.

4. A construction material as defined by claim 1 containing a dispersion of exploded mica in the proportion of about 10 to 30%, by volume, of the rubber.

5. A construction material as defined by claim 1 in which at least some of the comminuted rubber is in the form of shreds.

GEORGE BELL.
PHILLIP LEBOVITZ.

REFERENCES CITED

The following references are of record in the file of this patent:

UNITED STATES PATENTS

| Number | Name | Date |
|--------|------|------|
| 65,179 | Day et al. | May 28, 1867 |
| 346,729 | Daniels | Aug. 3, 1886 |
| 1,610,864 | Lefebure | Dec. 14, 1926 |
| 1,728,990 | Draulette | Sept. 24, 1929 |
| 2,041,223 | Bollman | May 19, 1936 |

FOREIGN PATENTS

| Number | Country | Date |
|--------|---------|------|
| 214,224 | Great Britain | Mar. 27, 1924 |